US006845361B1

(12) United States Patent
Dowling

(10) Patent No.: US 6,845,361 B1
(45) Date of Patent: Jan. 18, 2005

(54) VIRTUAL-WAIT QUEUE FOR MOBILE COMMERCE

(76) Inventor: Eric M. Dowling, 5107 5th Ave., Holmes Beach, FL (US) 34217

( * ) Notice: Subject to any disclaimer, the term of this patent is extended or adjusted under 35 U.S.C. 154(b) by 0 days.

(21) Appl. No.: 09/542,538

(22) Filed: Apr. 3, 2000

Related U.S. Application Data

(63) Continuation-in-part of application No. 09/120,499, filed on Jul. 21, 1998.

(51) Int. Cl.[7] .............................................. G06F 17/60
(52) U.S. Cl. ................. 705/5; 705/13; 705/15
(58) Field of Search ............................. 705/1, 13, 5, 6, 705/26, 15; 340/825.28, 825.29, 825.36, 825.49

(56) References Cited

U.S. PATENT DOCUMENTS 5,978,770 A  *  11/1999  Waytena et al. ................ 705/5
6,542,751 B1  *  4/2003  Blink et al. .................. 455/458

FOREIGN PATENT DOCUMENTS

GB           2307324 A   *  5/1997
WO       WO 99/09766 A1  *  2/1999

OTHER PUBLICATIONS

Warren Lutz, "Galileo battles Sabre in wireless CRS space", Jun. 2000, 2 pages, available at webtravelnews.com.*
Unknown Author, Six Flag Introduces Computerized Virtual Queue Technology at Nine U.S. Theme Parks for 2002 Season, Fe 1, 2002, Business Wire, 0058, 2 pages.*

* cited by examiner

Primary Examiner—John G. Weiss
Assistant Examiner—Richard Woo
(74) Attorney, Agent, or Firm—Eric M. Dowling

(57) ABSTRACT

A method and a system are provided for maintaining a virtual-wait queue that controls access by customers to a physical resource such as a restaurant table. The method and system are especially adapted for use by customers operating Internet-enabled wireless devices. The system operates by maintaining a virtual-wait queue data structure capable of storing a plurality of entries. Each entry is representative of a customer. The system accepts an instruction from a premises I/O device indicating to either add or delete an entry to the data structure. The system also accepts an instruction from a network connection to either add or delete the remote customer into or from the virtual wait queue. The virtual wait queue system indicates to the remote customer the estimated time left in the queue, freeing the customer from the need to wait in line.

54 Claims, 7 Drawing Sheets

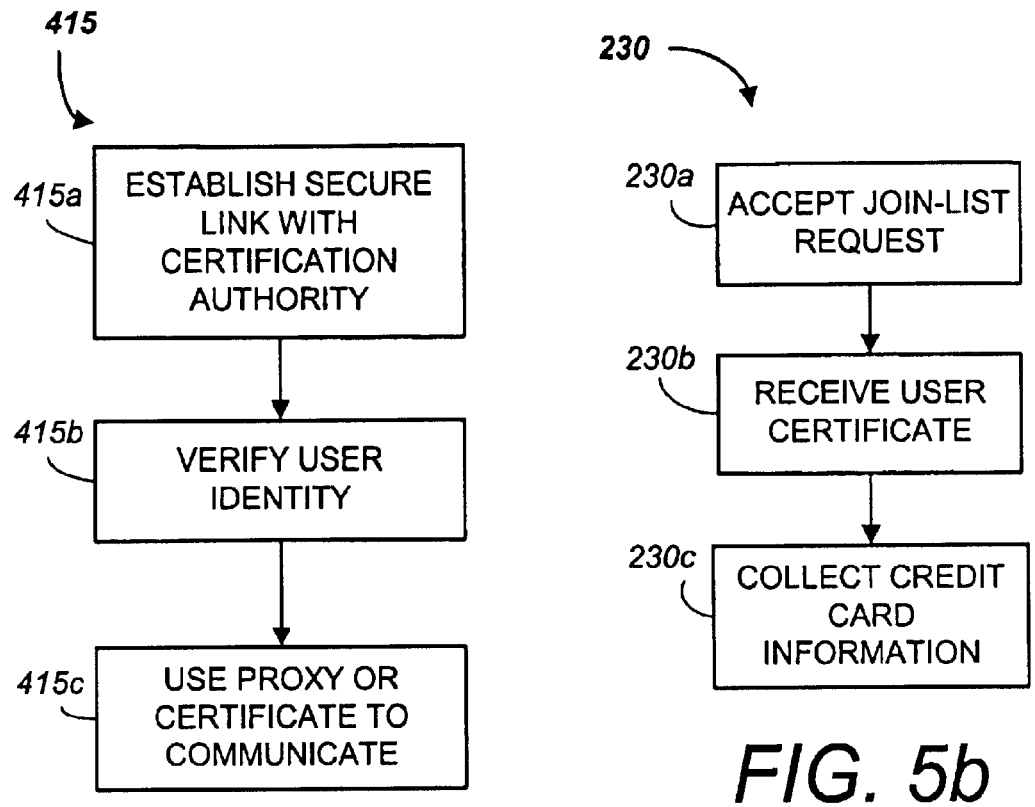
FIG. 5a
FIG. 5b
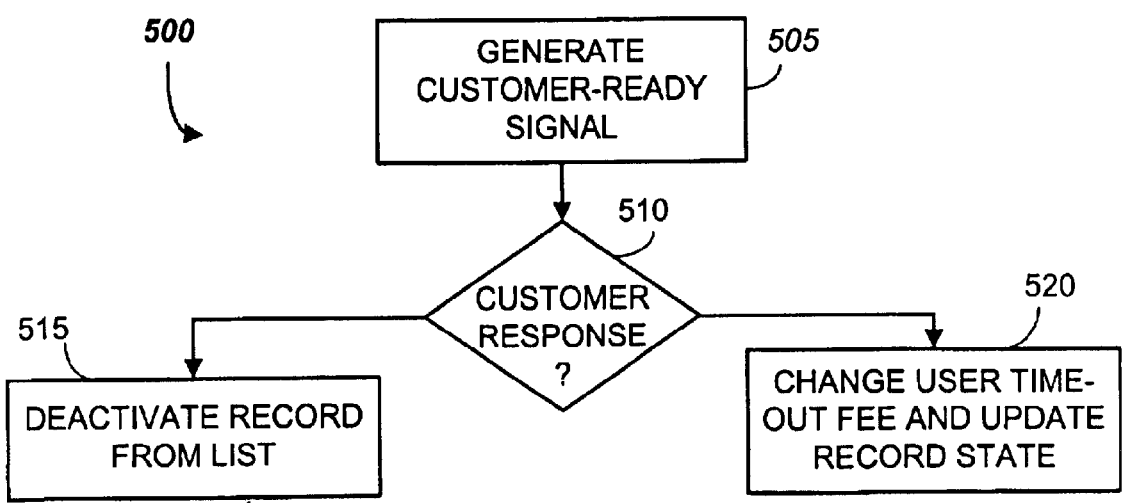
FIG. 5c

VIRTUAL-WAIT QUEUE FOR MOBILE COMMERCE

This application is a continuation-in-part of a co-pending application Ser. No. 09/120,499, filed by the applicant of this application on Jul. 21, 1998.

BACKGROUND OF THE INVENTION

1. Field of the Invention

This invention relates generally to mobile commerce. More particularly, the invention relates to systems and methods to maintain an electronic waiting list using local, remote, and wireless computerized devices.

2. Description of the Related Art

Mobile commerce is an emerging area. In mobile commerce, users generally interact with a business entity using a mobile computerized device with wireless telecommunications means. The computerized device generally includes a microcomputer for operating a web browser and other functions such as a personal or business organizer. Other computer functions may also be supported all the way up to a fully functional computer capable of running general application programs over, for example, a lightweight operating system. The computerized device typically includes a wireless network connection, for example to a cellular system capable of providing Internet or other network access services. The computerized device may also include other telecommunication functions such as H.323 Internet telephony, cellular telephony, one or more direct radio link(s), and/or a local broadcast reception radio link. Moreover the computerized device may include a GPS receiver capable of determining the geographical location of the device. In this application, a computerized device having some or all of the above functions is referred to as a "mobile unit."

Various embodiments of a mobile units are described in copending U.S. patent applications whose serial numbers are 09/195,171 and 09/418,055. These applications are incorporated by reference and describe various mobile units, systems and architectures for mobile commerce. It should be noted that these applications are provided for background purposes only, and any conflict in terminology or concept between the present application and the incorporated applications should be resolved in favor of the present application. In general, the mobile unit is similar to a Palm Pilot device, except it also has an Internet connection and preferably either a GPS receiver and/or a direct radio receiver or transceiver for local radio communications. The local radio link, for example, may involve a local broadcast signal that sends an Internet address to users within a small geographical vicinity of a broadcast domain transmitter. The mobile unit may be integrated with cellular telephone functions, and the Internet connection and the telephony functions may be implemented, for example, using wideband CDMA technology. Such mobile units have already been reported, and their design and construction is understood by skilled artisans.

One problem encountered in ordinary commerce involves waiting queues. For example, on a Friday night, a popular restaurant may have a one-hour wait. The prior art way to deal with this type of situation is to make a reservation or to get on a waiting list. Reservations are typically made via a telephone. This takes time and is inefficient. Also, some restaurants are only open at night, so this approach may require a person to be available to answer the telephone. It would be desirable to provide a means for customers to make reservations or set up appointments via a mobile computerized device without the need for human interaction.

In this application the term "commerce" is meant to broadly to other types of activities and non-profit organizations. In this application, all such activities will be considered to fall under the general term of "commerce." Individuals involved in a virtual-wait queue will generally be referred to as "customers," although they may be students or other types of people. The term "user" or "remote user" is also used to refer to the "customer."

Prior art electronic list management systems and wait queues have been developed for telephone systems, to include Internet telephony. Callers dial in and are typically presented with interactive voice response prompts. The customers usually dial touch-tones or speak words to indicate their specific needs. In some cases such needs can be entered via an Internet connection. An electronic queue management system manages one or more queues based upon the remote caller's needs. Eventually the caller or Internet user is granted a telephone connection to an operator. In some systems the customer can hang up and the system will call the customer back. In the copending U.S. patent application 09/120,499, an interface window is coupled back to the caller's web browser to indicate to the caller the estimated amount of time left in the call-queue. This indicates to the customer approximately when a call-back will be received.

This application incorporates by reference copending application 09/120,499. Certain methods of the present invention find enabling support in the copending application 09/120,499. The relevant part of the copending application 09/120,499 focuses on the discussion and claims provided in connection with FIG. 2 of that application.

While these prior art systems are advantageous for managing telephone wait-queues, they lack the ability to provide customers with physical access to resources. New systems and methods are needed to enable the advantages provided by certain advanced telephone queue management systems to be used to control access to physical resources such as restaurant tables, doctors, financial aid workers, etc. Systems and methods are currently lacking that enable a customer to join a wait-queue for a physical resource and then roam freely until their time left in the queue has diminished.

A pressing need is to provide a system to manage waiting lists for providing physical access to resources so that customers need not physically stand in line or wait in a designated area for their turn to come up. Sometimes wait queues are long and other times they are short. For example, a customer may wish to check the waits at several restaurants before making a choice. Also, the customer may with to enter the wait list remotely. It would be desirable to have an electronic wait list that is managed by both the customer and the staff of an enterprise. This would be useful for many types of enterprises to include restaurants and health care facilities, for example.

It would similarly be desirable to provide a "virtual-wait queue" or a "virtual line" for any enterprise, including a financial aid unit at a major university. With such a system, students could "hold their place in line" without having to wait all day long in front of a building for their turn to come up. Virtual-wait queues thus have the potential to increase productivity in many types of activities.

SUMMARY OF THE INVENTION

The present invention overcomes difficulties with prior wait list management techniques by providing novel mobile waiting list management systems and methods. An electronic wait list is managed at a place of commerce. A staff member can enter an entry in the list, for example with an electronic pen or a keyboard. The staff member can also delete a name from the list, for example when a customer has started being serviced. Remote and/or mobile users can preferably view information related to the list via network such as the Internet. This information may include an estimated wait time for the wait list. The remote user can also enter and/or delete his or her name to/from the list. The customer can then subsequently monitor their estimated time left in the queue using a web browser such as a portal on a mobile unit. When the user is near the top of the queue, the system can page the user to let the user know the wait time is near the end. The system, apparatus and methods described hereinbelow enable the concept of a "virtual-wait queue." The virtual-wait queue system delivers improved customer care by enabling customers to wait their turn in line for physical access to a resource while at the same time being freed to go about their own business. A new method for doing business by providing improved customer care using the inventive virtual-wait queue management system is also provided.

Details of the system and the methods involved in the inventive virtual-wait queue management system will become apparent in the detailed description of the invention. Other features and options will also become apparent.

BRIEF DESCRIPTION OF THE FIGURES

The various novel features of the present invention are illustrated in the figures listed below and described in the detailed description which follows.

FIG. 5a is a flow chart illustrating a method for allowing remote users to join a virtual-wait queue using secure authentication techniques.

FIG. 5b is a flow chart illustrating a method for performing secure authentication of a user by a server in order to control access to a virtual-wait queue.

FIG. 5c is a flow chart illustrating a method for holding an authenticated user accountable for entering a virtual-wait queue but never appearing for services.

DETAILED DESCRIPTION OF THE PREFERRED EMBODIMENTS

Figure 1A:
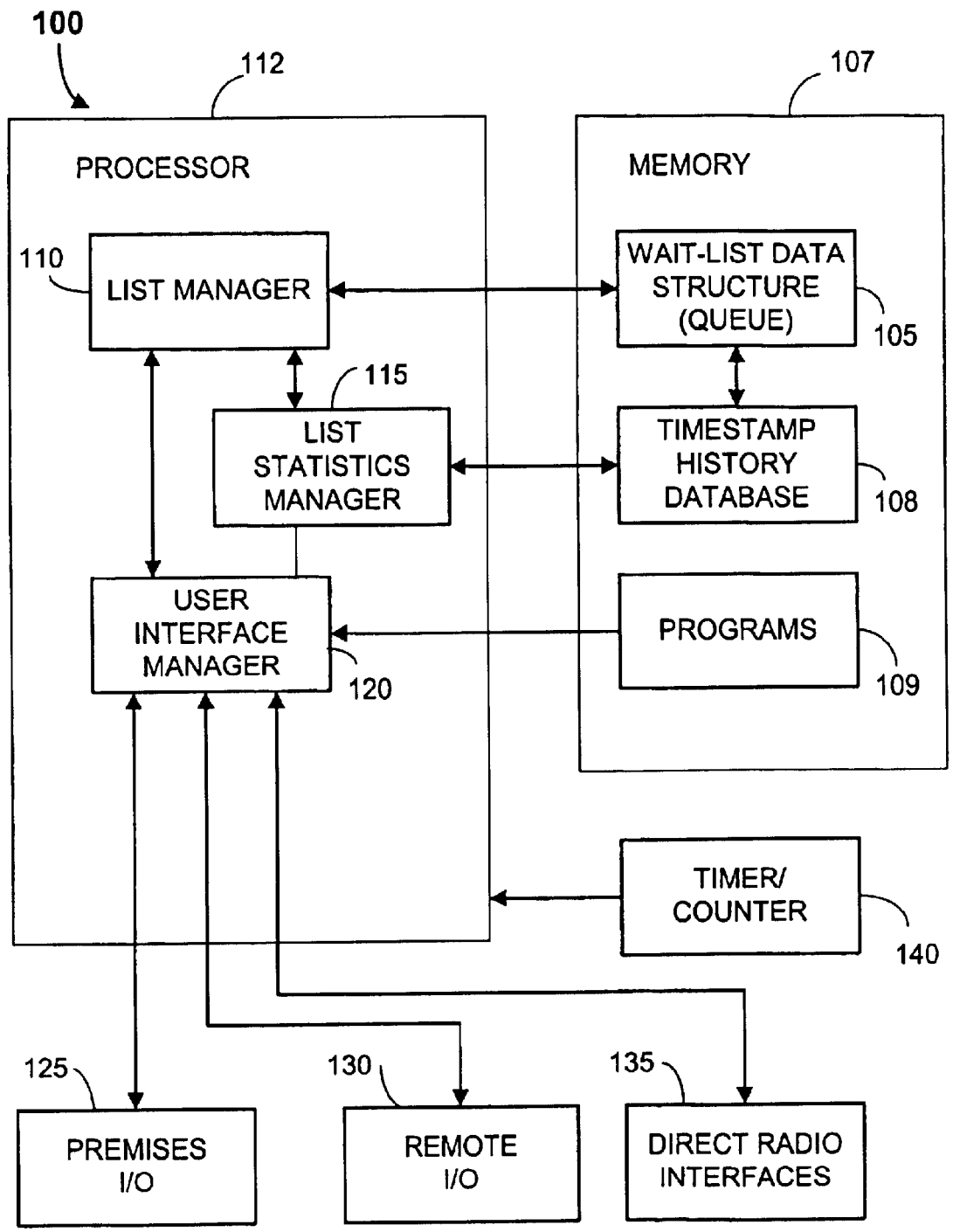
FIG. 1a is a block diagram illustrating a mobile commerce wait list management system.

FIG. 1a is a block diagram representing a preferred embodiment of a virtual-wait queue management system 100. The virtual-wait queue management system enables remote and mobile customers to be queued for access to a physical resource such as a restaurant table. The virtual-wait queue management system 100 is especially useful for customers with mobile units and enables a management means for mobile commerce.

The system 100 is preferably implemented using standard computerized equipment including a processor 112 coupled to a memory 107, and input-output devices as is discussed below. Full-custom and semi-custom embodiments are possible but are not deemed to be the preferred implementation at this time. The system 100 may be implemented as an on-premises system. Some or part of the system 100 may also be implemented remotely from the commerce premises as a network server. For example, the network server may be coupled to a cellular data network and/or to the Internet. In such embodiments, the network server typically acts as a central server and may manage a plurality of waiting lists. For example, a central server may maintain a list for each restaurant in a chain of restaurants or for all doctors' offices falling under a certain health services organization.

The description below assumes the system 100 is implemented in a single premises-based system. In embodiments involving a remote central server, any of the software modules discussed below may be moved to the central server. The central server has a similar architecture to the system 100. In general the software modules discussed below may be distributed in various ways with some executing on the premises equipment and others on the remote central server. All such embodiments are contemplated by the present invention.

The system 100 includes a wait-list data structure 105. The wait-list data structure is preferably implemented within the computer memory 107. The computer memory may be implemented in various ways, for example any combination of DRAM, SRAM, EEPROM, a magnetic medium such as a tape or disk, or an optical storage medium. Preferably the wait-list data structure 105 is implemented in semiconductor memory, and a nonvolatile backup may also be desired if EEPROM is not used. The wait-list data structure may be implemented as an array of strings, but is preferably implemented as a linked list of records. Each record in the linked list preferably includes a string identifier identifying the individual or entity represented by the record entry. Each record may also include other information, for example the estimated time left in the wait queue, customer related information, GPS positional information, or any other set of information associated with a given list entry. The field of computer science teaches many types of data structures, and a skilled artisan can adapt this body of knowledge to form many appropriate data structures to house the virtual-wait queue. All such embodiments are within the scope of the present invention. An exemplary record structure is discussed in more detail below in connection with FIG. 1b.

Coupled to the wait-list data structure 105 is a list manager 110. The list manager 110 is a software module that also executes on the processor 112. Another software module that executes on the processor 112 is a list statistics manager 115. The list statistics manager may be coupled to the list manager 110, the wait list manager 105, or both. The list statistics manager may be directly coupled to one or both of these modules or may be indirectly operatively coupled via an intermediate data structure. In this system, couplings between modules are generally made via function calls, memory accesses, or other means such as message passing or software message boxes. Also, the software modules 110 and 112 execute on the processor 115, but their programs reside in memory 107 in a programs section 109.

Another software module that typically resides in the program section 109 of the memory 107 and executes on the processor 112 is the user interface manager 120. The user interface manager 120 is operative to accept inputs from customers and staff in order to maintain a virtual-wait list. The user interface manager 120 processes inputs to provide data for use by the list manager 110 and optionally the list statistics manager 115. Depending on the embodiment, the user interface manager may reside on premises at the place of commerce, or within a central network server. In some embodiments a separate I/O processor or I/O controller may be used to embody the interface manager 120 and other related I/O routines.

To the user interface manager 120 is coupled a premises I/O device 125. This coupling may be via a direct hardwired coupling, a local wireless connection such as a wireless LAN, or (for remote-central server embodiments) via a remote network connection such as a wireline or wireless Internet connection. The premises I/O device 125 typically involves a computer terminal interface with a keyboard and/or and electronic pen. In some systems other types of premises I/O devices may be used, for example a laser continuity circuit ("electronic eye") or a challenge and reply protocol between a premises radio system and mobile unit using a direct radio or a network connection. Such automated means are for systems where the premises staff need not manually enter data into the system to remove a customer from the virtual-wait queue. The premises I/O device 125 may be housed in the same enclosure as the processor 112 and the memory 107, or may be housed separately. The premises I/O device 125 may also be implemented using a speech recognition interface, or other I/O means. When the system 100 is largely implemented in a central server, the premises I/O device is preferably coupled via a network to the rest of the list management system 100.

Also coupled to the user interface manager 120 is a remote I/O module 130. The remote I/O module 130 accepts customer inputs from remote devices such as Internet web browsers and mobile units. Note the term "mobile unit" is described in the background section above and generally refers to a hand-held or dash-mounted computerized device with a network connection and possibly other features such as a GPS receiver and/or a direct radio receiver or transceiver. The remote I/O module 130 involves a coupling that is able to communicate with remote web browsers and preferably mobile units. The remote I/O module 130 preferably includes a connection to a network such as the Internet. That is, in most embodiments, the remote I/O module 130 involves a network card coupled to an Internet service provider or an enterprise network. Note when the system 100 is implemented as a central network server, the premises I/O device and the remote users are both generally coupled to the server via the remote I/O module 130.

Also coupled to the user interface manager is an optional direct radio interface module 135. The direct radio interface module 135 may include one or more radio link types to communicate directly with mobile units. For example, the direct radio interface module 135 sends out a local broadcast signal to page a mobile unit. The direct radio interface module may also provide an alternate packet radio connection to communicate with mobile units so that a toll network charge need not be assessed for using a public wireless data network. In some systems a two-way radio connection is used so that the premises system and the mobile unit may implement application layer communication exchanges. In other systems, a packet is broadcast that causes a specified mobile unit to make a request to a specified Internet address related to the wait-queue management system 100. The direct radio interface module is optional and may be used instead of or in addition to the remote I/O module 130. In a preferred embodiment, the system 100 includes both the remote interface module 130 and the direct radio interface 135.

The system 100 also preferably includes a timer module 140 coupled to the processor 112. In some systems the timer module 140 may be implemented as an onboard peripheral of the processor 112. The timer 140 is preferably coupled to the processor 112 via an interrupt signal, but may also be polled. The timer preferably maintains a wall clock time that can be read by the processor 112, but the wall clock time and other timer/counter values may also be maintained in software. Preferably the list manager 110 and/or the list statistics manager 115 process timer events and maintain various running counts as is described in more detail below. In some systems a separate interrupt driven software process is implemented whose responsibility is to maintain one or more timer counts. These timer counts may then be coupled to the list manager 110 and/or the list statistics manager 115 for further processing and use in virtual-wait queue management and statistics monitoring. In general, the invention optionally uses a timing device. A timing device includes a timer/counter and one or more associated software modules used to maintain counts and/or running times such as wall clock times. In processor based systems the timing device generally involves a timed interrupt and at least one associated software routine. Similarly all-hardware timing devices may be used that maintain one or more counts in hardware.

The operation of the system 100 is discussed in connection with the methods practiced by the system 100 and the users of the system. Embodiments of these methods are provided in flow chart form in FIGS. 2–5. The operation of the modules in the system 100 as they practice these methods are discussed in connection with the subsequent figures. A method of doing business that enables improved customer care using the system 100 is discussed in connection with FIG. 6.

Figure 1B:
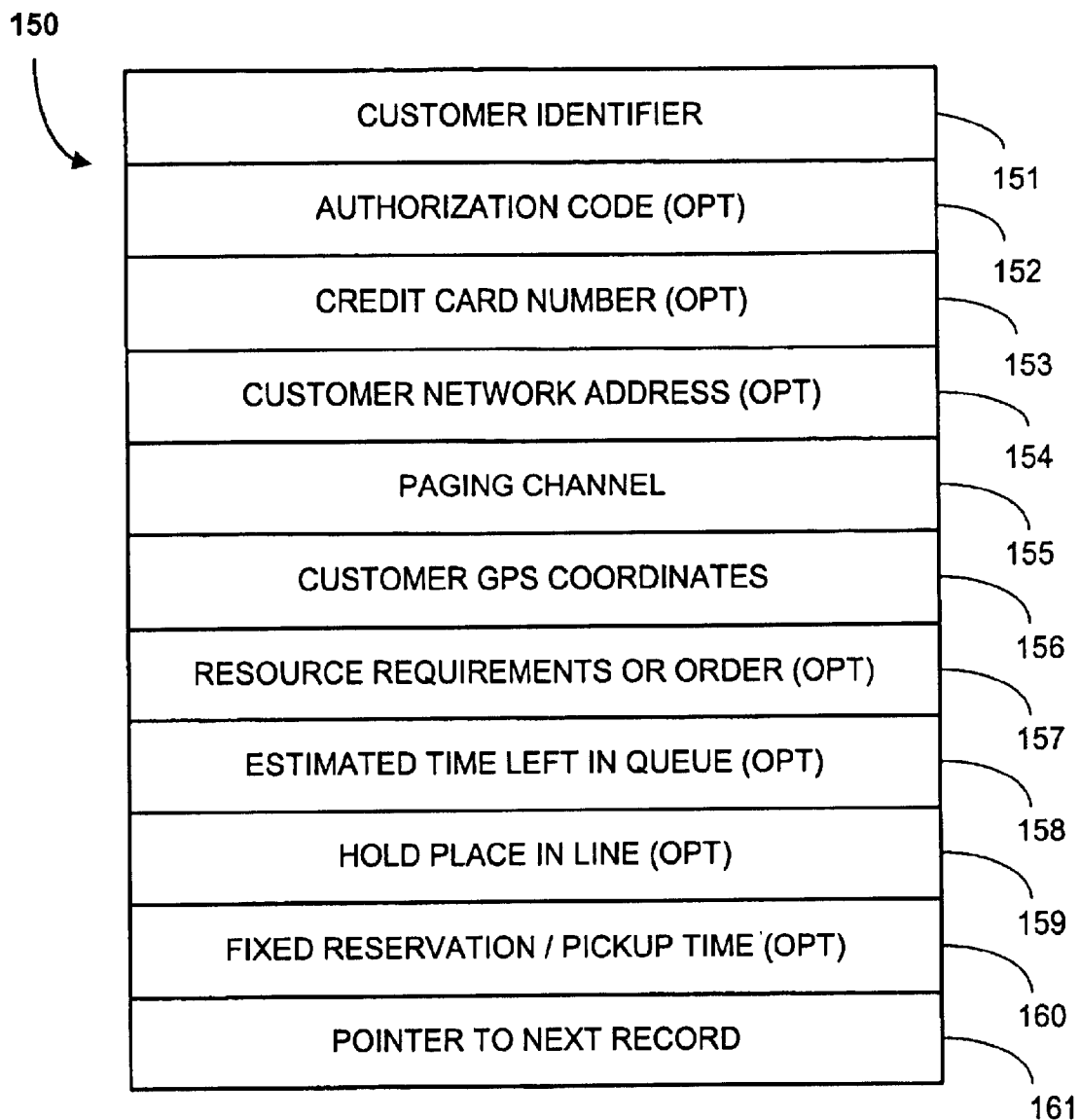
FIG. 1b is a diagram illustrating an exemplary data structure used to represent an entry in a wait-list data structure.

Referring now to FIG. 1b, an example of a customer record 150 as contained in the wait-list data structure 105 is illustrated. A first record field 151 includes a customer identifier such as the customer's name. This may be as simple as the customer's last name jotted down using an electronic pen, for example. In a minimal embodiment, this is the only record entry, and the wait-list data structure is made up of an array of such records. Preferably, however, some or all of the fields discussed below are present. Other fields can also be added to the record 150 without departing from the scope of the present invention. Similarly, the record 150 may optionally include pointers to information fields and may be constructed in various equivalent ways without departing from the scope of the present invention.

A second record field 152 includes an authorization code. When a customer asks to be placed on the list manually at the front desk on premises, this may be marked with a blanket "okay" code. When the customer requests to be added to the list remotely, this field is provided to optionally require the customer be authenticated. In accordance with an aspect of the present invention, this optional feature enables a means to control access to the list and to thereby prevent malicious users and competitors from making a given virtual-wait list appear very long.

A third record field 153 includes the customer's credit card number. This is preferably provided by a secure link to an authentication certificate authority. Again, this option allows enterprises to force customers to identify themselves and to accept charges for adding themselves to the list and then abandoning their position. This optional feature enables an enterprise to prevent malicious users and competitors from overloading a virtual-wait list.

A fourth field 154 includes a customer's network address. This network address may involve a telephone number, an Internet transport and socket address, and H.323 telephony address, or a direct packet radio address, for example. This optional field allows the system 100 to direct messages to the customer in the virtual-wait queue.

A fifth field 155 indicates a paging channel on which the customer can be reached. This field may indicate a channel number, a paging phone number, or just have a binary entry indicating the customer can accept a page. The page can come from a public paging network or from a local broadcast unit that sends paging signals directly from the enterprise premises via a direct radio link. This feature is also optional but is preferred.

A sixth field 156 indicates the geographical position of the customer. This optional field is used in some embodiments when the customer's mobile unit includes a GPS receiver. A request is sent from the system 100 via the remote I/O interface 130 or a direct radio interface 135 to the mobile unit. The mobile unit responds to the request with its GPS coordinates. This optional feature allows the enterprise premises staff to know where the customer is. This feature also allows a time to be calculated to generate a paging signal that notifies the customer when to start heading over to the enterprise premises to access a physical resource. In this case the paging signal is sent based both on the customer's estimated time left in the queue and the customer's current geographical position.

A seventh field 157 indicates one or more customer requirements. For example in a restaurant, this might indicate the number of people in the party and hence a table-size requirement. In a doctor's office waiting room application, this might include a specific doctor's name, the type of specialist needed, or the symptoms of the individual. In general, this optional field is used to qualify the specific physical resources needed by customer waiting in the queue.

An eighth field 158 indicates the estimated time left in the queue for the customer. This field is optional because this estimate can be calculated based on the customer's position in the queue and timer/counter values and/or statistics held external to the customer's record. However, some embodiments maintain a copy of this number for each customer and allow the customer to monitor this number via a network connection or a direct packet radio link. Other embodiments allow customers to view their estimated-time-left-in-queue numbers but do not keep the numbers in the customer's record entries. All such embodiments are anticipated by the present invention.

A ninth field 159 includes an optional hold-place-in-line indicator. As is discussed below, this field is optional and indicates that a customer is currently unavailable and would like to let others in the virtual-wait queue pass while holding a place in line.

A tenth field 160 includes a reservation field. This field is optional and is used for customers who have a reservation for a fixed time. This field allows the virtual-wait queue of the present invention to be used in enterprises that allow customers to make fixed reservations as well as getting in line. Such a feature would be applicable to restaurants and doctor's offices for example. In systems where fixed reservations are allowed, the virtual queue estimated wait time calculation preferably takes reserved resources into account.

An eleventh field 161 includes a pointer to the next record entry in the wait-list data structure 105. This follows standard linked list management practices and is optional but preferred. When a user is added to the list, the pointer of the last record in the list is set to the newly added record. When a record is deleted from the middle of the list, the pointers are readjusted using standard list-pointer manipulation practice. As mentioned earlier, other fields can be added to the record structure and selected fields can be deleted without departing from the scope of the present invention.

Figure 2:
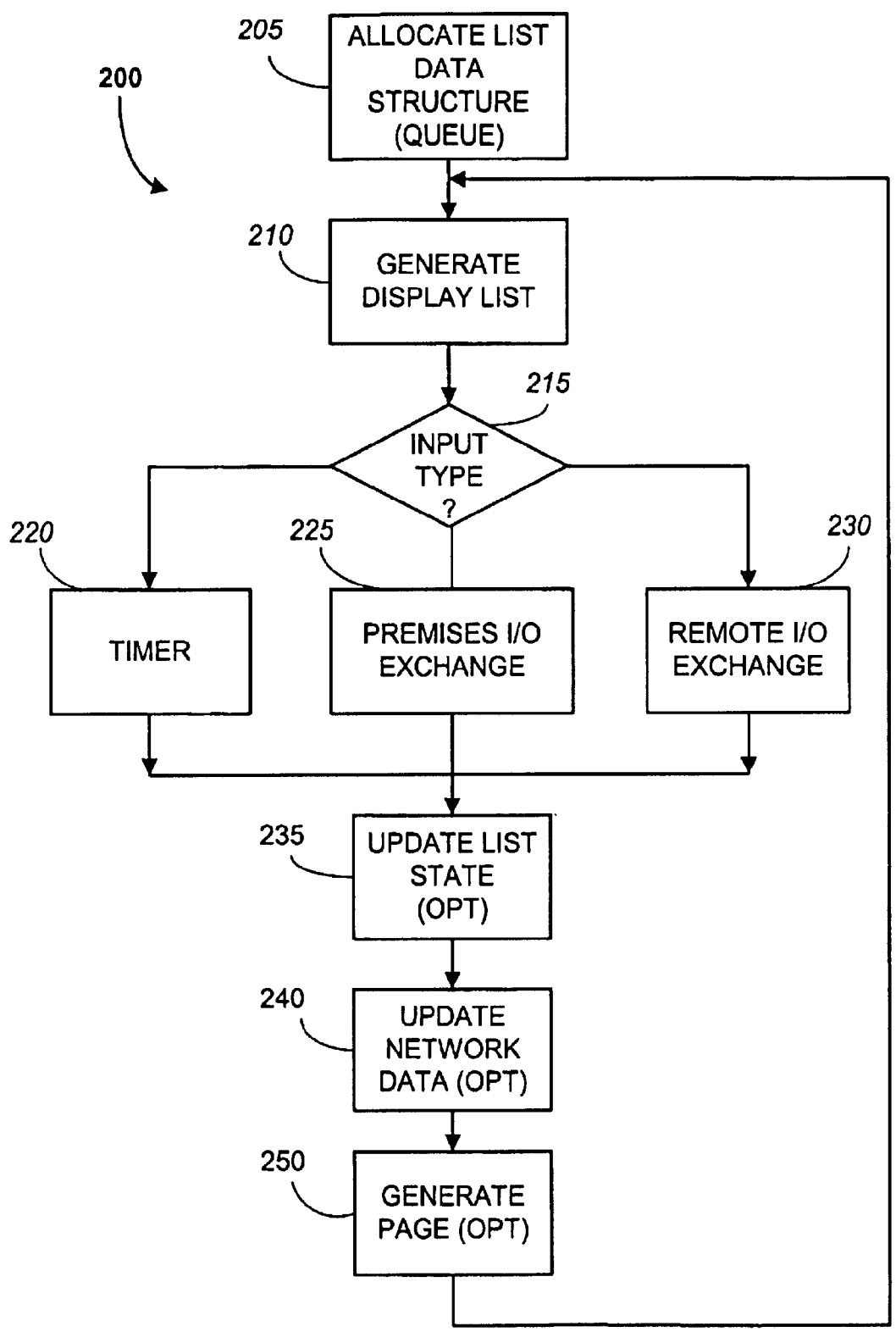
FIG. 2 is a flow chart representing an embodiment of a method practiced by the mobile commerce wait list management system of the present invention.

Referring now to FIG. 2, an embodiment of a method of managing a virtual waiting list using mobile commerce methods is illustrated in flow chart form. In a first step a list data structure is allocated. This step is generally practiced by the list manager 110 to initialize the wait-list data structure 105. This method step is generally implemented in computer code and may be performed using a static declaration such as an array declaration but is preferably performed using a dynamic data structure such as a the previously discussed linked list. When a linked list is used, the step 205 typically involves initializing one or more pointers and setting up memory areas using memory allocation commands or object oriented methods.

Control next passes to a step 210. In the step 210 a display list is generated. Typically this list is made available for viewing only to the staff of the commerce premises. Optionally the entire waiting list may be made visible to the general public via a network connection. In a preferred embodiment, the complete wait list display is only visible to the commerce premises staff. Once the current display list has been generated and made available to the intended audience, control passes to a step 215. Control remains in the step 215 until an input is received. The step 215 typically involves either polled or interrupt driven I/O as is known in the art.

One type of input that may be received is a timer interrupt signal. The detection of timer events allows wait-time statistics to be collected and customers to be notified of their estimated time left in the wait queue. When a timer event is detected, control passes to a step 220. In the step 220 timer/counter information such as a wall clock time stamp is generated. Other running counts may also be updated. These running counts are preferably readable by the list manager 110 and/or the list statistics manager 115. The step 220 may be implemented as an interrupt service routine and may set a ready-to-run signal to make the list manager module 110 or list statistics module 115 ready to run when certain counts have been reached.

Another type of input that can be received is a premises I/O exchange. This type of input arrives from the commerce premises, for example, when a staff member adds or deletes an entry to the list, or provides other qualifying information. When such events are detected, control passes to the step 225 to process information received from the enterprise staff. For example, in a restaurant a hostess may write down a customer's name who asks to be entered onto a waiting list. This may be done using an electronic pen, for example. Other information such as the number of people in the party may also be entered. The hostess may similarly strike out a name of an individual who as arrived to be seated. Although not illustrated in the control flow of the flow chart, this electronic pen or other I/O entry is preferably used to immediately update the display list created in the step 210. In central server based embodiments, data entered by a staff member is coupled via a network connection to the central server for processing.

Another type of input that can be received is a remote I/O exchange. When a remote I/O event is detected, control passes to the step 230 to process information received from a customer. The remote I/O exchange is initiated, for example by a remote Internet web browser. The remote Internet web browser may be a portal specifically designed to run on a mobile unit. Remote I/O exchanges allow customers to add themselves to the virtual-waiting list or delete themselves from the list. In some cases access controls may be added to prevent malicious users from interfering with the list. For example, a user may be required to provide a certificate that uniquely identifies the user. The use of certificates and authorization techniques are discussed in connection with FIG. 5.

One optional feature that can be performed in the step 230 is a request to hold place in queue. When such a request is received, other customers are allowed to pass a given customer in the queue. This allows a customer who is running late to not have to start all over in the queue once again. To discourage this type of behavior, the enterprise may optionally assess a fee for time spent in the queue with an active hold-place-in-line request. This feature allows users to use their time most efficiently and not be overly penalized for random schedule delays that may occur while going about their business during the time they are in the virtual-wait queue. By charging a fee for the time a customer holds a place in line, the enterprise discourages abuse of this feature. The rate charged for holding a place in line may also change as a function of how busy the enterprise is at the time and be communicated to the user in the same way as the time-left-in-queue is communicated. Embodiments can be developed that omit this feature.

Control passes from any of the steps 220, 225 or 230 to an optional step 235. The step 235 is preferably carried out by the list manager module 110. Control may be passed to the step 235 by a direct function call or by setting the list manager task ready to run, depending on the embodiment. In the step 235, the list manager module 235 updates the wait-list data structure 105 to reflect any changes. For example if a list entry has been added or deleted in the step 225 or 230, the wait-list data structure is modified to reflect the change. In some embodiments, certain timer events can trigger counts in the step 220 to cause the wait-list data structure to be changed. For example, if each wait list entry record includes a time-left-in-queue field 157, this field is periodically modified in response to timer-generated information. Also, a page signal may need to be generated when a customer's time-in-queue has reached a specified threshold.

In systems where the customer's record includes GPS data (156), an adaptive timer-threshold is preferably used that is dependent on how far away the customer is from the premises. For example if the customer is a mile away from the premises, the customer may be paged when the estimated time in queue is ten minutes. If the customer is waiting on premises in the lobby or in the bar, for example, the page may be sent when the time remaining in queue has reached zero.

Control next passes to an optional step 240. In the step 240, information is posted to a network so that the customer or the enterprise staff can view the modified information. Notably, a customer will want to be able to monitor the estimated amount of time left in the virtual-wait queue for that customer. As an example, while the customer waits one hour for a seat in a restaurant, the customer is free to run other errands. By monitoring the time left in the wait queue as indicated by the display of his or her mobile unit, the customer can gage when to start heading over to the restaurant. This feature can be used in addition to, or in lieu of, the generation of a page signal. As discussed above, if the user encounters a schedule delay, the user may optionally request to hold a place in line if this option is made available. The enterprise may optionally assess a charge for holding a place in line.

Control next passes to an optional step 250. The step 250 sends a page signal to the user when the user's place in line has come up. Optionally a page signal may be sent to warn the customer that the time is approaching. As discussed previously, in systems where the GPS coordinates of a user are known, the page signal may be sent at a time that depends on the distance between the user and the enterprise. The page signal may be sent via the Internet, a public paging network, or a direct radio link using, for example, packet radio techniques.

In the method 200, several steps are listed as optional. This is because certain embodiments may not include all of the envisioned features. Also, the method 200 represents a conditional loop. Depending on the event detected in the step 215 and the current counter values, some steps may not be necessary. For example, even in a system that includes customer paging, the paging step 250 will only be executed under certain conditions. Similarly, if the step 215 encounters a timer interrupt and no actions are needed, all of the steps 235, 240 and 250 may be skipped. If a step is skipped, control passes to the next step. The next step may or may not be similarly skipped as well. Moreover, these steps may be carried out for each of one or more customers currently waiting in the virtual-wait queue. That is, the method 200 may be wrapped into another loop structure that loops over each customer in the list. Similarly, the method 200 may be interrupt driven and may be implemented using a multitasking model where an instance of the method is practiced in parallel for each customer. Any of these embodiments or combinations thereof are contemplated by the present invention.

Figure 3:
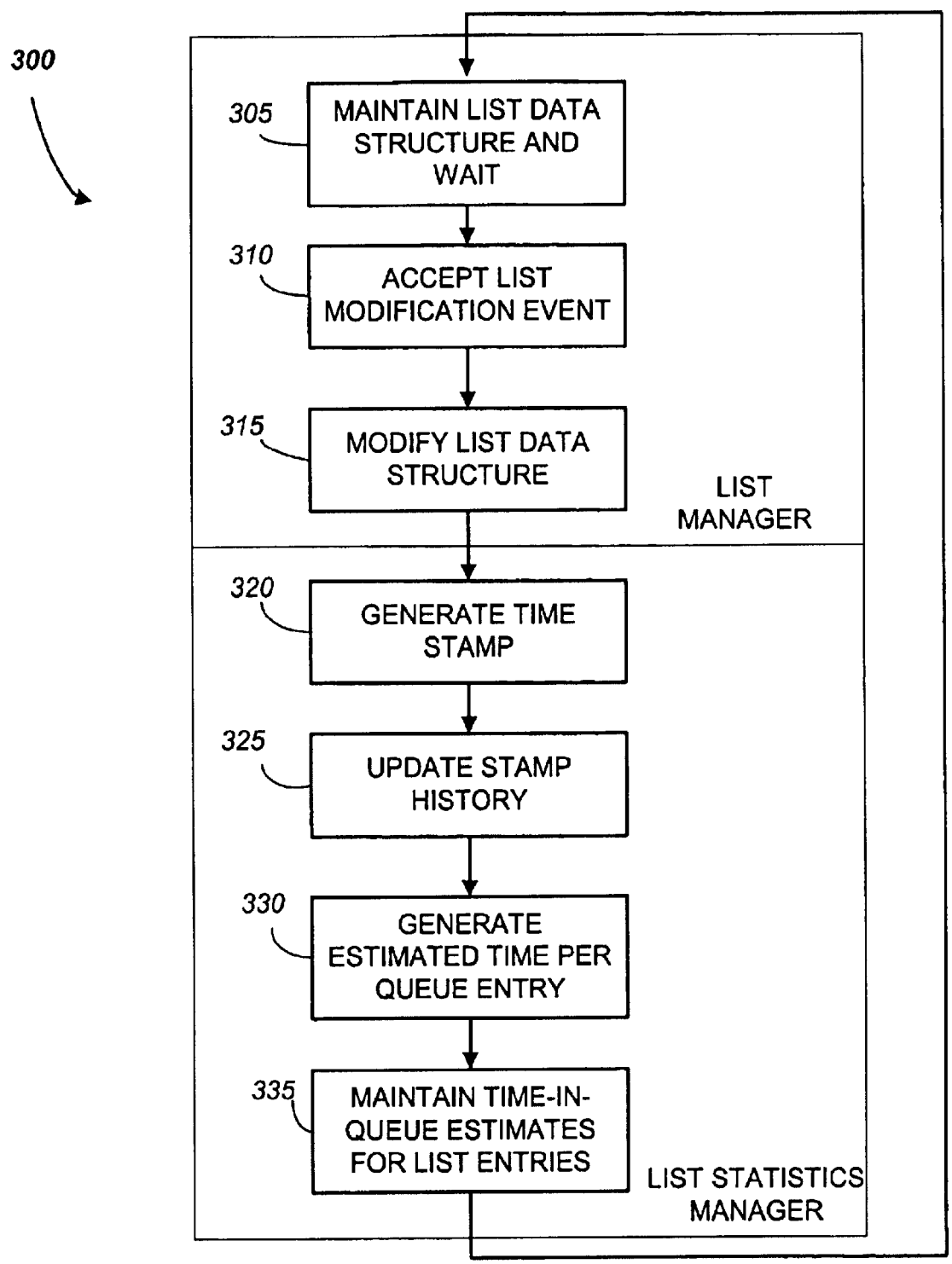
FIG. 3 is a flow chart representing an embodiment of a method practiced by the list manager and list statistics manager software modules of the present invention.

Referring now to FIG. 3, a method 300 practiced by the list manager 110 and the list statistics manager 115 is illustrated in flow chart form. This method includes two submethods as indicated in the figure. In a step 305 the virtual-wait list structure 105 is updated (if a change occurs) to reflect the current list state. In the step 305, the list manager 110 awaits further input. Control next passes to a step 310 after an input event is detected. The input event may be generated by a timer event, data entry by enterprise staff, or data entry in response to a remote user such as a customer. Control next passes to a step 315 where one or more records in the wait-list data structure 105 are modified. This may include adding or deleting entries, modifying time-in-queue record fields, placing customers in hold-place-in-line state, modifying or adding information to the customer's record, or any other modification necessary to process the input event.

Control next passes to a step 320. In the step 320 a timestamp is generated. Control may optionally pass into a task entry point to the step 320 in parallel with passing to the step 305. This flow chart is exemplary in nature and many ways to implement the functionality taught by the present invention will become apparent to those skilled in the art. In the step 320 timer information is read and a time stamp is generated.

Next control passes to a step 325 where the timestamp history database 108 is updated. The timestamp database 108 includes timestamp information and correlates past and present timestamps to list management events. For example statistics such as the average amount of time that a customer waits in the queue is preferably measured. The average time the customer next in line waits before being called is also preferably measured. In many applications separate statistics are maintained based on the characteristics of the customer. For example, in the case of a restaurant, the number of people in the party can be important. For example a party waiting for a four-top may have an average wait of twenty minutes based on the most recent seatings, but all eight-tops may have just been seated within the last fifteen minutes. In such as situation the wait for the next four-top would be expected to be twenty minutes while the wait for the next eight-top might be expected to be two hours. In such situations, virtual sub-queues are preferably maintained depending on the resource needs of the customer. Another example is a health care facility whereby virtual subqueues are maintained for each doctor.

Control next passes to a step 330 where past history and enterprise state information is correlated with timestamp data to produce an estimated time left in the queue for one or more of the customers in the queue. As discussed above, this is generally estimated based upon the average time for customers previously serviced by the wait list management system. Factors such as average number of no-shows and such are preferably factored into this calculation. The specifics of this calculation are application dependent, but involve simple mathematics. In simple embodiments, past history averages are used, preferably using similar conditions. For example history data recorded on previous busy Friday nights would be collected and used to predict waits on a current busy Friday night. In more sophisticated embodiments the recent seating history would be factored in and statistics indicating the average usage time of a table would be factored in. In some cases customer resource needs are factored into the calculation. For example a doctor seeing a patient reporting general stress may take on average ten minutes while a patient requiring a specific type of minor surgery may take an hour. In general, the more information the system has, the better job it can do at estimating average times. The system can accept manual inputs from premises staff and in some embodiments uses the customer resource requirement entries of the records ahead of a given customer to estimate the time left in the queue for that given customer. The step 330 generally involves a calculation that generates an estimate of the amount of time a given customer has left in the virtual-wait queue. This calculation can be based on past history statistical information such as the average time the next-person-in-line waits multiplied by the number of people in the virtual-wait queue before the given customer. Similarly, the calculation may involve specific customer resource requirements, the number of people in line in front of the customer, the number of staff members servicing the line, and possibly other information such as percentage of no-shows and number of people in the hold-place-in-line state.

Control next passes to a step 335. In the step 335 wait time estimates for one or more customers in the wait queue are recorded. In some cases these numbers are added to the field 158 of the record 150. In other cases the number is simply recorded in a semiconductor memory and optionally coupled to the customer and/or the enterprise staff. This is preferably performed by updating information displayed on a web page visible to a standard web browser or a mobile unit's web browser display. Control next back around to the step 305. As discussed above, the looping structure of the method 300 is exemplary and the method may be practiced by one or more interrupt-controlled parallel tasks (i.e., processes). The specific control structure depends on a given operating environment in a specific embodiment.

Figure 4:
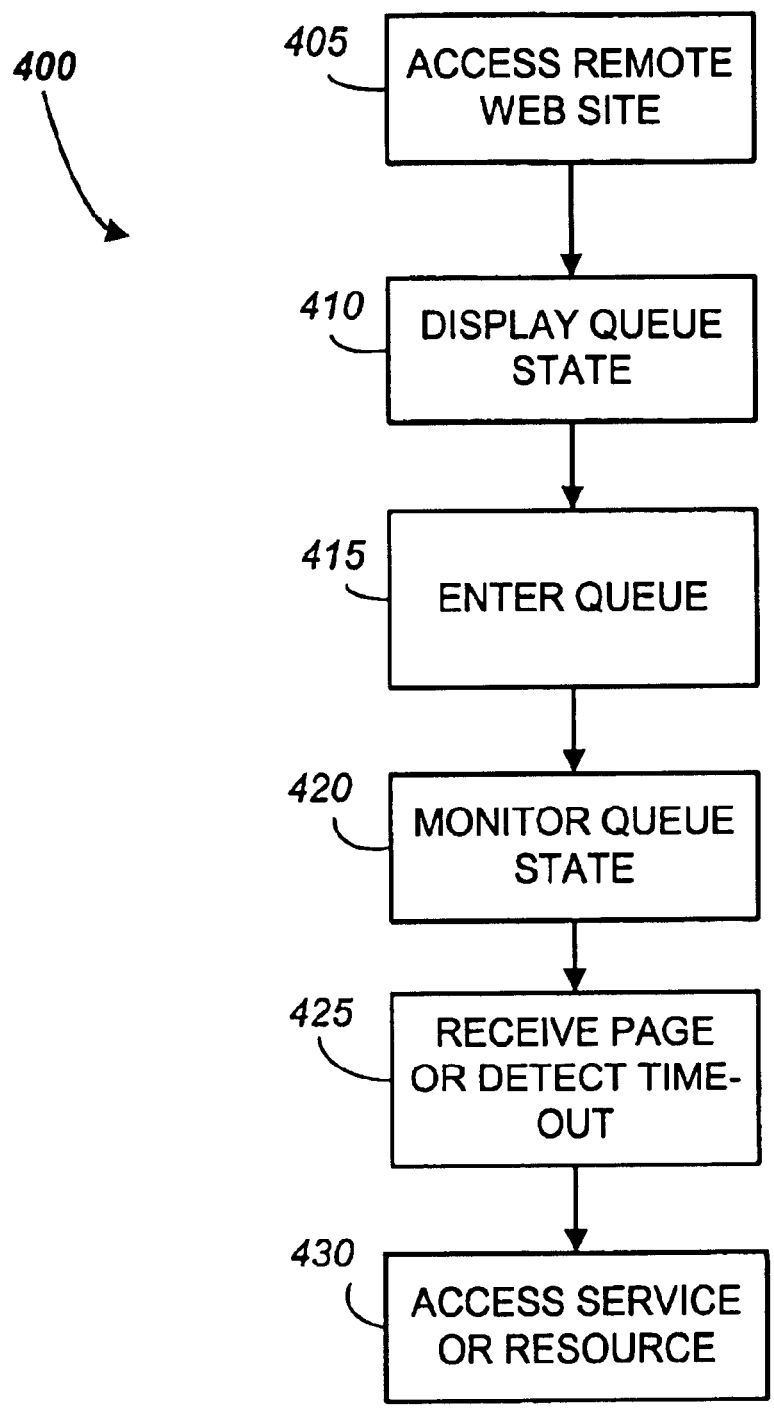
FIG. 4 is a flow chart illustrating a method practiced by users interacting with the mobile commerce wait list management system of the present invention.

Referring now to FIG. 4, a method practiced by the users of the system 100 is described in flow chart form. The system 100 by its very nature induces the customer to practice the method 400 using a web browser. The web browser is preferably implemented in a mobile unit. In some cases the user may begin the method 400 using a web browser located in a home or office and may then complete the method 400 using the web browser portal in a mobile unit. This method corresponds to a method of mobile commerce.

In a first step 405, the user accesses a remote web site corresponding to the enterprise operating the system 100. Control passes to a step 410 where the queue state is displayed to the user. Typically this would provide the user with an expected time-in-queue. Next control passes to a step 415 where the user selects to enter the queue. In some embodiments the user may optionally place an order at this time to allow the order to begin to process. For example if the enterprise is a restaurant, the user may wish to place an order early. In other cases the user may specify a specific resource requirement such as the number of people in a party. If the enterprise is a doctor's office, the user may wish to request a special service and/or a specific doctor. Sometimes the time in the queue will be affected by the order placed or the resource requirement identified in the step 415. For example, the time a user spends in the queue may be a function of when the order is ready. Once the user has entered the queue, control passes to an optional step 420 where the user monitors the queue state. This generally tells the user how much time is left before the user's turn will come up. Control next passes to an optional step 425 where the user receives notification that the queue wait has ended. Control next passes to a step 430 whereby the user accesses the service (or product).

It should be noted that when the step 415 includes having a user specify a specific resource or order for a product, the method and systems of the present invention may be used for a slightly different purpose. For example, suppose a customer wishes to order a pizza and later pick it up. The present system is then used to allow the user to place a specific order in the step 415. For example this may involve the user interacting with an electronic order form via the Internet using a mobile unit's web browser portal. In some cases the user may further specify a desired pick-up time. This may cause the premises system to delay the order and is similar in concept to a hold-place-in-line request with an automated fill time. It is also similar to a fixed reservation as is discussed above. The present invention improves upon prior art mobile commerce systems by providing the user with an estimated pick-up time via the Internet or other network. After the user puts in the order, the system can either periodically update a page viewable by the customer with an estimated pick-up time, or the system can respond to user requests by providing the most recent estimated pick-up time. For example the user may simply hit a "refresh" button and the refreshed web page will show the most recently estimated pick-up time. In peak periods where delays are encountered, the system preferably takes the timestamp and history data into account to give accurate pick-up time estimates. Again, the ability for a customer to keep track of the time an order will actually be filled frees the customer to pursue other activities and leads to improved customer care and satisfaction. If something unexpected comes up, the user may request the order to be deleted or rescheduled for a different pick-up time.

Referring now to FIG. 5a, one optional embodiment of the step 415 of the method 400 is illustrated. In a step 415a the user establishes a secure connection to a central certificate authority. In a step 415b the user's identity is verified. In a step 415c the certificate authority acts as a proxy between the customer and the list management system 100, or optionally a certificate is provided that authorizes the customer to communicate directly over a secure link to the list management system 100. In other embodiments a secure socket connection is established directly between the customer and the system 100. In this case the customer may be required to send credit card information to the system 100 as authentication. If the customer does not show up for the requested service, the customer may be assessed a fee in some systems, especially at peak hours. Either of these types of authentication prevent customers from making a list appear to be long when in fact it is not. Both of these means provide protection against a "list attack" by potential hackers.

Referring now to FIG. 5b, the one embodiment a portion of the step 230 of the method 200 is illustrated. In this embodiment, certification is used. In a substep 230a, a join-list request is received from a remote user. In a substep 230b a user certificate is received either directly from the user or via a certificate authority proxy server. In either case, the substep 230b receives a confirmation of the identity of the user. Control next passes to a third substep 230c where the user's credit cart information is received. Preferably this is received via encrypted means as are known in the art. The certificate is used to verify the identity of the user and the credit card information is optionally used to charge users who enter the list but never access the end product or service. In some cases the certificate may simply involve the user's credit card number data received via a secure socket connection. Any combination of these optional substeps may be employed to minimize risk of malicious use of the system to keep customers away from a business by overloading the waiting list.

Referring now to FIG. 5c, a method 500 practiced by the system 100 for processing a customer who is next in line is illustrated in flow chart form. In a step 505 a customer-ready signal is generated. Control next passes to a step 510 where a determination is made that checks whether the customer is available to be serviced. This is usually provided in response to an enterprise staff making an annotation using the premises I/O device 125. In some embodiments, a challenge and response protocol between the system 100 and the customer's mobile unit may be used. The challenge and response protocol is preferably implemented using a low power direct radio connection, but a wireless Internet connection may also be used. If the customer is available then control passes to a step 515 where the customer's entry in the queue is marked as "serviced" and is removed from the active queue. In some cases this is performed in response to a staff member striking a customer's name from a list-display device using an electronic pen. A record is preferably kept for use with statistics gathering as discussed previously. If the step 510 determines the user is not available, the user is optionally charged a fee in a step 520 and the record is also removed from the active list. In some systems the user may be put into a grace period where the user is in a hold-place-in-line state for a period of time. In some systems deactivated records may be deleted. The amount of history information desired that may be kept is optional.

Figure 6:
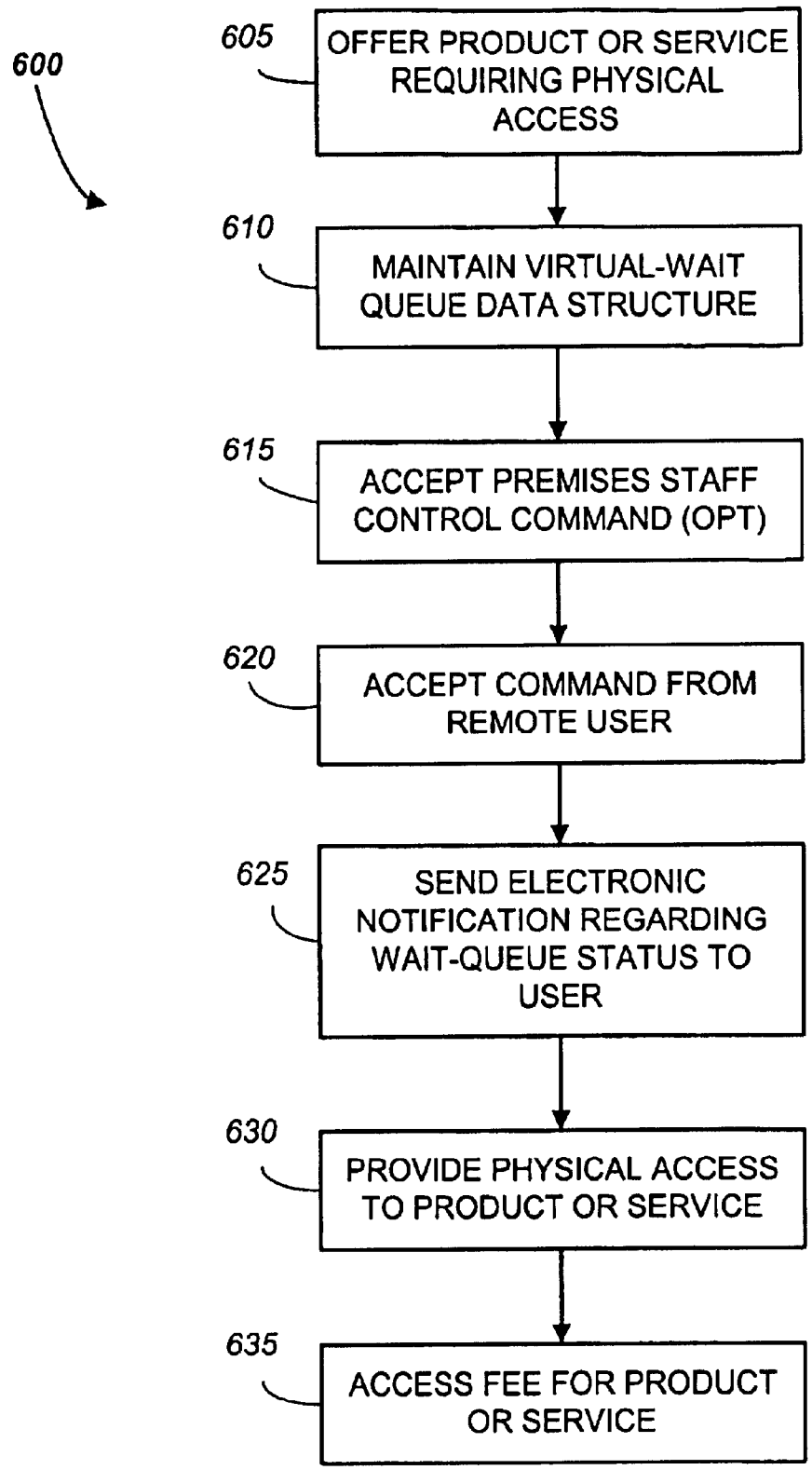
FIG. 6 is a flow chart illustrating a method of doing business by providing customers access to a physical resource using a virtual-wait queue.

FIG. 6 is a flow chart illustrating a method of doing business 600 by providing customers access to a physical resource using a virtual-wait queue. In a first step 605 an enterprise offers for sale a product or service requiring access to a physical resource. For example, the enterprise may be a restaurant whereby food is a product offered for sale and the physical resource is a table. In another example the enterprise may be a health care facility and the service offered for sale is a visitation with a doctor and the physical resource is the doctor and an examination room.

The enterprise may include a non-profit organization such as a university where the service may involve a more implicit concept. For example, the physical resource may involve a financial aid specialist or advisor. In such a case the students education would be considered to be the service offered for sale. The student's tuition would involve the payment. This is an example where the virtual wait queue is used in an implicit manner to streamline operations whereby a fee is assessed, but not for the specific resource usage.

Once the product or service has been offered for sale, the next step 610 is to maintain a virtual-wait queue data structure for controlling access to at least one of the physical resources. The virtual wait queue is generally maintained using the previously described system and methods with some selected set of options.

In an optional step 615, a virtual-wait queue control command is received from the premises staff. For example in a restaurant enterprise, a hostess may enter a name onto a waiting list using an electronic pen (premises I/O device 125). In another example, this step involves indicating when a customer has been granted physical access to the physical resource so that the wait-queue data structure is modified to reflect the fact that the customer who was next in line has now been deleted from the wait queue. In some systems this step may be automated, for example the customer may walk through a passage whereby an electronic eye (e.g., laser beam/photo detector continuity circuit) indicates when the customer has accessed the resource. In still other embodiments a challenge and response protocol may be used on a low power radio link to query and verify that the customer's mobile unit is in the vicinity of the granted physical resource.

In a step 620, a virtual-wait queue control command is received from a remote user. This command is typically received via network connection such as a wireless network and/or the Internet. In some embodiments remote user commands are received via a direct radio link. The remote user commands are preferably originated from an Internet terminal, especially a mobile unit as discussed previously. The step 620 is similar to the step 415 and any of the options discussed in connection with the step 415 may be applied in the step 620.

In a step 625 and electronic notification is coupled to the remote user. The step 625 is optional but is preferred. The electronic notification is preferably provided via a network connection that is routed to a remote user's mobile unit. The electronic notification may broadcast as a paging signal to the user's mobile unit over a direct radio link. Other means of transmitting the notification include a public paging system or a cellular telephone system. In a preferred embodiment, this step also involves providing a periodically updated estimated-time-in-queue indication via a network. Preferably, the user can monitor the estimated-time-in-queue indication using a web browser or the web-browser portal software that runs on the customer's mobile unit. In such systems the step 625 involves providing an estimate of the time a user has left in the queue before access to the resource is provided. This could involve access to a table, an order being ready to pick up, access to a doctor, for example.

In a step 630, physical access to the resource is provided. For example a customer's party is seated at a restaurant or a patient is granted access to an examination room in a health care facility. In a step 635 the customer is charged a fee for the product or the services rendered. As discussed above in the example involving a university student, the customer may pay a general fee as opposed to a direct usage fee. The method 600 thereby provides an improved method of doing business whereby customers are granted physical access to resources without having to wait in lines for extended periods of time. The method 600 enables businesses to provide improved customer service, thereby increasing customer satisfaction and ultimately, revenues.

In enterprises that provide as take-out services and allow orders to be placed in the step 620, the method 600 focuses on accepting orders from mobile users and keeping the mobile users abreast of the times their will be filled. In certain cases where customers are in a hurry, they may seek a table, but only want to be seated minutes before being served. The present system allows such efficient use of time by keeping the user informed of when their order is ready and optionally sending a page signal at the appropriate time as previously discussed, optionally by taking GPS information into account. As discussed in connection with the step 415, the enterprise may require advance payment via a credit card prior to filling an order for a mobile customer.

Although the present invention has been described with reference to specific embodiments, other embodiments may occur to those skilled in the art without deviating from the intended scope. Therefore, it is to be understood that the invention herein encompasses all such embodiments that do not depart from the spirit and scope of the invention as defined in the appended claims.

What is claimed is:

1. A method for maintaining a virtual-wait queue for access to a physical resource, comprising:

maintaining in a computer server a queue data structure, the queue data structure for designating the relative positions in line of a plurality of customers, the queue data structure containing an ordered list of entries related to customer records, wherein with at least one such entry is associated a hold-place-in-line indicator, wherein the hold-place-in-line indicator is selectively set to be in at least one of a first state and a second state, wherein in the first state, the at least one such entry is selectively set to move toward the front of the queue as other customer entries in the queue are deleted from the front of the queue and wherein in the second state, the at least one such entry is set to maintain a fixed position in the queue while other customer entries are allowed to pass;

accepting an input from a packet based data network, wherein a remote user mobile wireless device is wirelessly coupled to the packet based data network via a wireless access node, and at least a portion of the input is wirelessly transmitted from the remote user mobile wireless device;

transmitting at least partially via the packet based data network to the remote user mobile wireless device an indication of an estimate of the amount of time left for the user to wait in order to have access to a physical resource;

controlling access to the physical resource by allowing a customer access to the physical resource based upon the position of the customer's associated entry in the queue substantially when the entry associated with the customer has reached the front of the queue data structure;

receiving via the packet based data network at a time before the user has reached the end of the queue a first request sent from the remote user mobile device to hold a remote user's position in the queue;

in response to receiving the first request, toggling the hold-place-in-line indicator of the record associated with the remote user mobile wireless device from the first state to the second state;

maintaining the queue data structure by advancing any entries associated with customers whose hold-place-in-line indicator is in the first state toward the front of the queue as other customer entries are deleted from the queue as their associated customers are granted physical access to the physical resource, while at the same time holding one or more entries whose hold-place-in-line indicator had been selectively set to be in the second state in a set of one or more relative fixed positions in the queue, thereby allowing customer entries whose associated hold-place-in-line indicator is in the first state to pass the one or more customer entries whose associated hold-place-in-line indicator is in the second state;

receiving a second request from the remote user mobile wireless device to be re-set to move through the queue and to thereby change the state of the hold-place-in-line indicator to back to the first state; and continuing to control access to the physical resource, wherein the remote user's entry reassumes its position in the queue where the remote user's place was held in line so that the remote user's entry can advance to the front of the queue data structure as other user entries are removed from the front of the queue data structure and the associated customers are granted access to the physical resource.

2. The method of claim 1, further comprising:

transmitting via the network connection to at least one second customer mobile wireless device other than the remote user mobile wireless device a second indication of an estimate of the amount of time left that the second customer will have to wait in order to have access to a physical resource;

wherein the a second indication of an estimate of the amount of time left in the queue takes into account that one or more records in front of the at least one second customer's record are in the second state.

3. The method of claim 1, wherein the indication of an estimate of the amount of time left in the queue takes into account the average number of no-shows based on past history data.

4. The method of claim wherein the indication of an estimate of the amount of time left in the queue takes into account the number of resources available to service the queue.

5. The method of claim 1, wherein the indication of an estimate of the amount of time left in the queue takes into account the specific user resource requirements and number of users in front of the user in the queue who require the same resource.

6. The method of claim 1, wherein the remote user is charged a fee for holding a place in the queue.

7. The method of claim 6, wherein the fee is based upon the amount of time spent in the holding of the place in the queue.

8. The method of claim 1, wherein the input includes an order for a product of service.

9. The method of claim 1, wherein the transmitting is performed periodically to keep the remote user informed of the estimated time when the remote user will be granted access to the resource.

10. The method claim 1, wherein the transmitting is performed one or more times in response to a third request received via the network, wherein the third request is to update the remote user of a currently estimated time when the remote user will be granted access to the resource.

11. The method of claim 1, wherein the packet based data network comprises at least a path through the Internet and the user views the indication using a web browser.

12. The method of claim 1, wherein the continuing to control access factors in the customer's geographical location as identified by a GPS receiver in the remote user mobile wireless device to determine the substantially when the entry associated with the customer has reached the front of the queue data structure, so as to provide the customer time to reach the physical resource when his turn has come up to access the physical resource.

13. The method of claim 1, wherein the input comprises an indication of a request to join the queue.

14. The method of claim 1, wherein the physical resource corresponds to a set of one or more tables for use by customers of a restaurant.

15. The method of claim 1, wherein the physical resource corresponds to a set of one or more health care workers and the health care worker's associated health care physical resources.

16. A method for maintaining a virtual-wait queue for access to a resource, comprising:

maintaining in a computer server a queue data structure, the queue data structure for designating the relative positions in line of a plurality of customers, the queue data structure containing an ordered list of entries related to customer records, wherein with at least one such entry is associated a hold-place-in-line indicator, wherein the hold-place in-line indicator is selectively set to be in at least one of a first state and a second state, wherein in the first state, the at least one such entry is selectively set to move toward the front of the queue as other customer entries in the queue are deleted from the front of the queue and wherein in the second state, the at least one such entry is set to maintain a fixed position in the queue while other customer entries are allowed to pass;

controlling access to the physical resource by allowing a customer access to the physical resource based upon the position of the customer's associated entry in the queue substantially when the entry associated with the customer has reached the front of the queue data structure;

receiving a first request sent from a remote user mobile device to hold a remote user's position in the queue at a time before the user has reached the end of the queue;

in response to receiving the first request, toggling the hold-place-in-line indicator of the record associated with the remote user mobile wireless device from the first state to the second state;

maintaining the queue data structure by advancing any entries associated with customers whose hold-place-in-line indicator is in the first state toward the front of the queue as other customer entries are deleted from the queue as their associated customers are granted physical access to the physical resource, while at the same time holding one or more entries whose hold-place-in-line indicator had been selectively set to be in the second state in a set of one or more relative fixed positions in the queue, thereby allowing customer entries whose associated hold-place-in-line indicator is in the first state to pass the one or more customer entries whose associated hold-placein-line indicator is in the second state;

receiving a second request from the remote user mobile wireless device to be re-set to move through the queue and to thereby change the state of the hold-place-in-line indicator to back to the first state; and continuing to control access to the physical resource, wherein the remote user's entry reassumes its position in the queue where the remote user's place was held in line so that the remote user's entry can advance to the front of the queue data structure as other user entries are removed from the front of the queue data structure and the associated customers are granted access to the physical resource.

17. The method of claim 16, wherein the remote user is charged a fee for holding a place in the queue.

18. The method of claim 17, wherein the fee is based upon the amount of time spent in the holding of the place in the queue.

19. The method of claim 16, wherein the remote user mobile device couples the first request wirelessly to an access point which is in turn coupled to a packet based data network.

20. The method of claim 16, wherein the physical resource corresponds to a set of one or more tables for use by customers of a restaurant.

21. The method of claim 16, wherein the physical resource corresponds to a set of one or more health care workers and the health care worker's associated health care physical resources.

22. A method for maintaining a virtual-wait queue for access to a physical resource, comprising:

maintaining in a computer server a queue data structure, the queue data structure for designating the relative positions in line of a plurality of customers, the queue data structure containing an ordered list of entries related to customer records, wherein with at least one such entry is also associated a hold-place-in-line indicator;

receiving, at a time before the user has reached the end of the queue, a first request sent from a remote user mobile device to hold a remote user's position in the queue, wherein prior to the first request, the remote user's entry was allowed to advance forward through the queue as other users were deleted from the front of the queue;

in response to receiving the first request, identifying by the hold-place-in-line indicator associated with the entry associated with the remote user that the associated entry is to be held in a relative fixed position in the queue while other entries are allowed to pass it;

maintaining the queue data structure by advancing toward the front of the queue a first group of zero or more entries associated with customers whose hold-place-in-line indicator indicates a desire to progress toward the front of the queue, while at the same time holding a second group of zero or more entries in relative fixed positions in the queue, wherein the second group of entries hold-place-in-line indicators indicate a desire to allow others to pass in the queue, thereby allowing customer entries in the first group to advance through the queue relative to customer entries in the second group, and wherein the number of entries in each of the first and second groups is a function of the hold-state-in line indicators associated with the entries of the of the total set of users in the queue;

receiving a second request sent from the remote user mobile device to again advance the remote user's position in the queue as other users are deleted from the front of the queue; and continuing to control access to the physical resource, wherein the remote user's entry once again is allowed to advance to the front of the queue data structure as other user entries are removed from the front of the queue data structure and the associated customers are granted access to the physical resource.

23. The method of claim 22, wherein the remote user is charged a fee for holding a place in the queue.

24. The method of claim 23, wherein the fee is based upon the amount of time spent in the holding of the place in the queue.

25. The method of claim 22, wherein the remote user mobile device couples the first request wirelessly to an access point which is in turn coupled to a packet based data network.

26. The method of claim 22, wherein the physical resource corresponds to a set of one or more tables for use by customers of a restaurant.

27. The method of claim 22, wherein the physical resource corresponds to a set of one or more health care workers and the health care worker's associated health care physical resources.

28. A system for maintaining a virtual-wait queue for access to a physical resource, comprising:

a computer server coupled to a packet based data network, wherein to the packet based data network is coupled to one or more wireless access points, wherein the computer server is operable to communicate with one or more wireless mobile devices via the packet based data network and one or more of the wireless access points;

wherein the computer server further comprises;

a queue data structure, the queue data structure for designating the relative positions in line of a plurality of customers, the queue data structure containing an ordered list of entries related to customer records, wherein with at least one such entry is associated a hold-place-in-line indicator, wherein the hold-place-in-line indicator is selectively set to be in at least one of a first state and a second state, wherein in the first state, the at least one such entry is selectively set to move toward the front of the queue as other customer entries in the queue are deleted from the front of the queue and wherein in the second state, the at least one such entry is set to maintain a fixed position in the queue while other customer entries are allowed to pass;

a first software function that is operable to accept an input, at least part of which is coupled from a remote user mobile wireless device via the wireless access point and the packet based data network;

a second software function that is operable to transmit at least partially via the packet based data network to the remote user mobile wireless device an indication of an estimate of the amount of time left for the user to wait in order to have ads to a physical resource;

a third software function that is operable to control access to the physical resource by allowing a customer access to the physical resource based upon the position of the customer's associated entry in the queue substantially when the entry associated with the customer has reached the front of the queue data structure;

a fourth software function that is operable to receive via the packet based data network a first request sent from the remote user mobile device to hold a remote user's position in the queue at a time before the user has reached the end of the queue;

a fourth software function that is operable to, in response to receiving the first request, toggle the hold-place-in-line indicator of the record associated with the remote user mobile wireless device from the first state to the second state;

a fifth software function that is operable to maintain the queue data structure by advancing any entries associated with customers whose hold-place-in-line indicator is in the first state toward the front of the queue as other customer entries are deleted from the queue as their associated customers are granted physical access to the physical resource, while at the same time holding one or more entries whose hold-place-in-line indicator had been selectively set to be in the second state in a set of one or more relative fixed positions in the queue, thereby allowing customer entries whose associated hold-place-in-line indicator is in the first state to pass the one or more customer entries whose associated hold-place-in-line indicator is in the second state;

a sixth software function that is operable to receive a second request from the remote user mobile wireless device to be re-set to move through the queue and to thereby change the state of the hold-place-in-line indicator to back to the first state; and a seventh software function that is operable to continue to control access to the physical resource, wherein the remote user's entry reassumes its position in the queue where the remote user's place was held in line so that the remote user's entry can advance to the front of the queue data structure as other user entries are removed from the front of the queue data structure and the associated customers are granted access to the physical resource.

29. The system of claim 28, further comprising:

an eighth software function that is operable to transmit via the network connection to at least one second customer mobile wireless device other than the remote user mobile wireless device a second indication of an estimate of the amount of time left that the second customer will have to wait in order to have access to a physical resource;

wherein the a second indication of an estimate of the amount of time left in the queue takes into account that one or more records in front of the at least one second customer's record are in the second state.

30. The system of claim 28, wherein the indication of an estimate of the amount of time left in the queue takes into account the average number of no-shows based on past history data.

31. The system of claim 28, wherein the indication of an estimate of the amount of time left in the queue takes into account the number of resources available to service the queue.

32. The system of claim 28, wherein the indication of an estimate of the amount of time left in the queue takes into account the specific user resource requirements and number of users in front of the user in the queue who require the same resource.

33. The system of claim 28, further comprising:

an eighth software function that is operable to charge the remote user a fee for holding a place in the queue.

34. The method of claim 33, wherein the fee is based upon the amount of time spent in the holding of the place in the queue (P13, lines 25 to page 14 line 6).

35. The system of claim 28, wherein the input includes an order for a product of service.

36. The system of claim 28, wherein the second software function is executed periodically to keep the remote user informed of the estimated time when the remote user will be granted access to the resource.

37. The system of claim 28, wherein the second software function is executed one or more times in response to a third request received via the network, wherein the third request is to update the remote user of a currently estimated time when the remote user will be granted access to the resource.

38. The system of claim 28, wherein the packet based data network comprises at least a path through the Internet and the user views the indication using: a web browser.

39. The system of claim 28, in the seventh software function factors in the customer's geographical location as identified by a GPS receiver in the remote user mobile wireless device to determine the substantially when the entry associated with the customer has reached the front of the queue data structure, so as to provide the customer time to reach the physical resource when his turn has come up to access the physical resource.

40. The system of claim 28, wherein the input comprises an indication of a request to join the queue.

41. The system of claim 28, wherein the physical resource corresponds to a set of one or more tables for use by customers of a restaurant.

42. The system of claim 28, wherein the physical resource corresponds to a set of one or more health care workers and the health care worker's associated health care physical resources.

43. A system for maintaining a virtual-wait queue for access to a resource, comprising:
- a computer server that is coupled to communicate with one or more wireless mobile devices;
- wherein the computer server further comprises;
- a queue data structure, the queue data structure for designating the relative positions in line of a plurality of customers, the queue data structure containing an ordered list of entries related to customer records, wherein with at least one such record is associated a hold-place-in-line indicator, wherein the hold-place-in-line indicator is selectively set to be in at least one of a first state and a second state, wherein in the first state, the at least one such record is selectively set to move toward the front of the queue as other customer records in the queue are deleted from the front of the queue and wherein in the second state, the at least one such record is set to maintain a fixed position in the queue while other customer records are allowed to pass;
- a first software function that is operable to control access to the physical resource by allowing a customer access to the physical resource based upon the position of the customer's associated entry in the queue substantially when the entry associated with the customer has reached the front of the queue data structure;
- a second software function that is operable to receive a first request sent from a remote user mobile device to hold all associated remote user's position in the queue at a time before the user has reached the end of the queue;
- a third software function that is operable to, in response to receiving the fist request, toggling the hold-place-in-line indicator of the record associated with the remote user mobile wireless device from the first state to the second state;
- a fourth software function that is operable to maintain the queue data structure by advancing any entries associated with customer whose hold-place-in-line indicator is in the first state toward the front of the queue as other customer entries are deleted from the queue as their associated customers are granted physical access to the physical resource, while at the same time holding one or more entries whose hold-place-in-line indicator bad been selectively set to be in the second state in a set of one or more relative fixed positions in the queue, thereby allowing customer entries whose associated hold-place-in-line indicator is in the first state to pass the one or more customer entries whose associated bold-place-in-line indicator is in the second state;
- a fifth software function that is operable to receive a second request from the remote user mobile wireless device to be re-inserted into the queue and to thereby change the state of the hold-place-in-line indicator to back to the first state; and
- a sixth software function that is operable to continue to control access to the physical resource, wherein the remote user's entry reassumes its position in the queue where the user's place was held in line so that the user's entry can advance to the rog of the queue data structure as other user entries are removed from the front of the queue data structure and the associated customers are granted access to the physical resource.

44. The system of claim 43, further comprising a
- a seventh software function that is operable to charge the remote user a fee for holding a place in the queue.

45. The system of claim 44, wherein the fee is based upon the amount of time spent in the holding of the place in the queue.

46. The system of claim 43, wherein the remote user mobile device couples the first request wirelessly to an access point which is in turn coupled to a packet based data network which is in turn coupled to the computer server.

47. The system of claim 43, wherein the physical resource corresponds to a set ozone or more tables for use by customers of a restaurant.

48. The system of claim 43, wherein the physical resource corresponds to a set of one or more health care workers and the health care worker's associated health care physical resources.

49. A system for maintaining a virtual-wait queue for access to a resource, comprising:
- a computer server that is coupled to communicate with one or more wireless mobile devices;
- wherein the computer server further comprises:
- a first software function that is operable to maintain in a computer server a qu ie data structure, the queue data structure for designating the relative positions il line of a plurality of customers, the queue data structure containing an ordered list of entnise related to customer records, wherein with at least one such entry is also associated a hold place-in-line indicator,
- a second software function that is operable to receive, at a time before the user has reached the end of the queue, a first request sent from a remote user mobile device to hold a remote user's position in the queue, wherein prior to the first request, the remote user's entry was allowed to advance forward through the queue as other users were deleted from the front of the queue;

a third software function that is operable to, in response to receiving the first request, identify by the hold-place-in-line indicator associated with the entry associated with the remote user that the associated entry is to be held in a relative fixed position in the queue while other entries are allowed to pass it;

a fourth software function that is operable to maintain the queue data structure by advancing toward the front of the queue a first group of zero or more entries associated with customers whose hold-place-in-line indicator indicates a desire to progress toward the front of the queue, while at the same time holding a second group of zero or more entries in relative fixed positions in the queue, wherein the second group of entries hold-place-in-line indicators indicate a desire to allow others to pass in the queue, thereby allowing customer entries in the first group to advance through the queue relative to customer entries in the second group, and wherein the number of entries in each of the first and second groups is a function of the hold-state-in line indicators associated with the entries of the of the total set of users in the queue;

a fifth software function that is operable to receive a second request sent from the remote user mobile device to again advance the remote user's position in the queue as other users are deleted from the front of the queue; and a sixth software function that is operable to continue to control to control access to the physical resource, wherein the remote user's entry once again is allowed to advance to the front of the queue data structure as other user entries are removed from the front of the queue data structure and the associated customers are granted access to the physical resources.

50. The system of claim 49, further comprising a a seventh software function that is operable to charge the remote user a fee for holding a place in the queue.

51. The system of claim 50, wherein the fee is based upon the amount of time spent in the holding of the place in the queue.

52. The system of claim 49, wherein the remote user mobile device couples the first request wirelessly to an access point which is in turn coupled to a packet based data network which is turned coupled to the computer server.

53. The method of claim 49, wherein a the physical resource corresponds to a set of one or more tables for use by customers of a restaurant.

54. The method of claim 49, wherein the physical resource corresponds to a set of one or more health care workers and the health care worker's associated health care physical resources.

* * * * *